(12) United States Patent
Watson

(10) Patent No.: US 7,513,565 B2
(45) Date of Patent: Apr. 7, 2009

(54) POWER DUAL ACTION ROCKER BOARD

(75) Inventor: Bradley Eugene Watson, Sharon (CA)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 11/728,514

(22) Filed: Mar. 26, 2007

(65) Prior Publication Data

US 2008/0179920 A1      Jul. 31, 2008

Related U.S. Application Data

(60) Provisional application No. 60/897,770, filed on Jan. 26, 2007.

(51) Int. Cl.
*B60R 27/00* (2006.01)
(52) U.S. Cl. ............ 296/199; 280/163; 280/166
(58) Field of Classification Search ........... 296/199, 296/209; 280/163, 166, 850
See application file for complete search history.

(56) References Cited

U.S. PATENT DOCUMENTS

2004/0100063 A1 *  5/2004  Henderson et al. ......... 280/166
2006/0214386 A1 *  9/2006  Watson ..................... 280/163

* cited by examiner

*Primary Examiner*—Lori L Lyjak
(74) *Attorney, Agent, or Firm*—Clark Hill PLC

(57) ABSTRACT

A rocker board assembly for a motor vehicle includes a housing adapted to be attached to the motor vehicle. An arm is slidable relative to the housing. A pivot housing is pivotal relative to the arm. A step is fixedly secured to the pivot housing. The rocker board assembly also includes a tilt link extending between the housing and the pivot housing for urging pivotal movement of the pivot housing as the arm slides relative to the housing to move the step between a stowed position and a deployed position.

27 Claims, 18 Drawing Sheets

POWER DUAL ACTION ROCKER BOARD

CROSS-REFERENCE TO RELATED APPLICATION

This application claims the benefit of U.S. Provisional Patent Application Ser. No. 60/897,770, filed Jan. 26, 2007.

BACKGROUND OF THE INVENTION

1. Field of the Invention

The invention relates to running boards for motor vehicles. More particularly, the invention relates to a rocker board assembly including a step movable between a stowed position and a deployed position.

2. Description of Related Art

Retractable running boards or steps are well-known in the art for allowing users to enter and exit a motor vehicle having a high ground clearance. These so-called retractable running boards or steps are generally movable between a retracted position, in which a step is tucked underneath an underbody of the motor vehicle, and an extended position, in which the step is spaced apart from the underbody of the motor vehicle for supporting the user. Retractable running boards may be incorporated in a rocker body panel of a motor vehicle, in which case these retractable running boards must package neatly to the rocker body panel of the motor vehicle and do so without compromising ground clearance. Further, the retractable running board should be integrated into the rocker body panel in order to improve the overall styling of the motor vehicle.

SUMMARY OF THE INVENTION

According to one aspect of the invention, a rocker board assembly for a motor vehicle includes a housing adapted to be attached to the motor vehicle. An arm is slidable relative to the housing. A pivot housing is pivotal relative to the arm. A step is fixedly secured to the pivot housing. The rocker board assembly also includes a tilt link extending between the housing and the pivot housing for urging pivotal movement of the pivot housing as the arm slides relative to the housing to move the step between a stowed position and a deployed position.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENT

Figure 1:
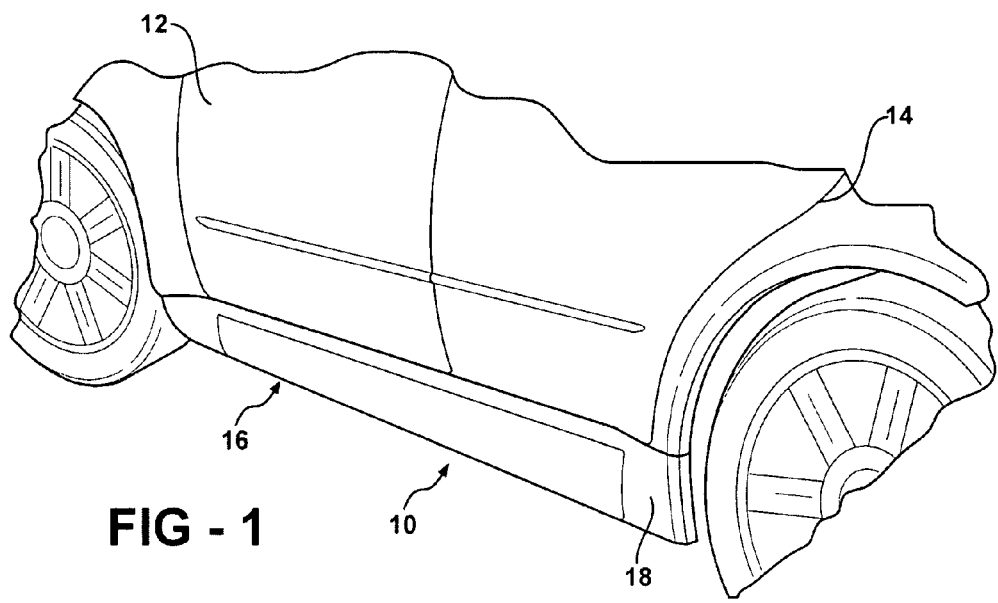
FIG. 1 is a fragmentary perspective view of a motor vehicle including a rocker board assembly having a step in a stowed position.
Figure 2:
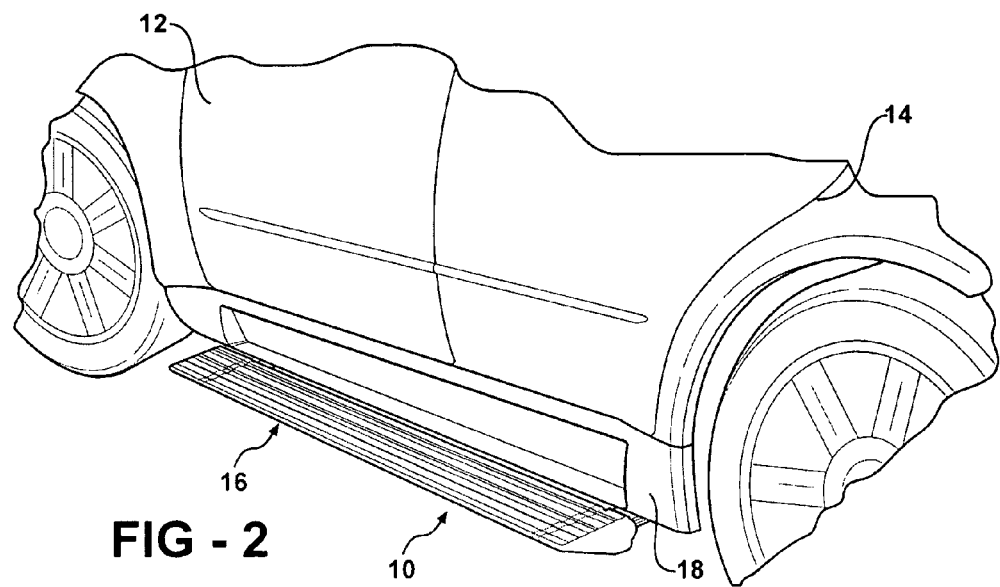
FIG. 2 is a fragmentary perspective view of the motor vehicle including the step in a deployed position.
Figure 3:
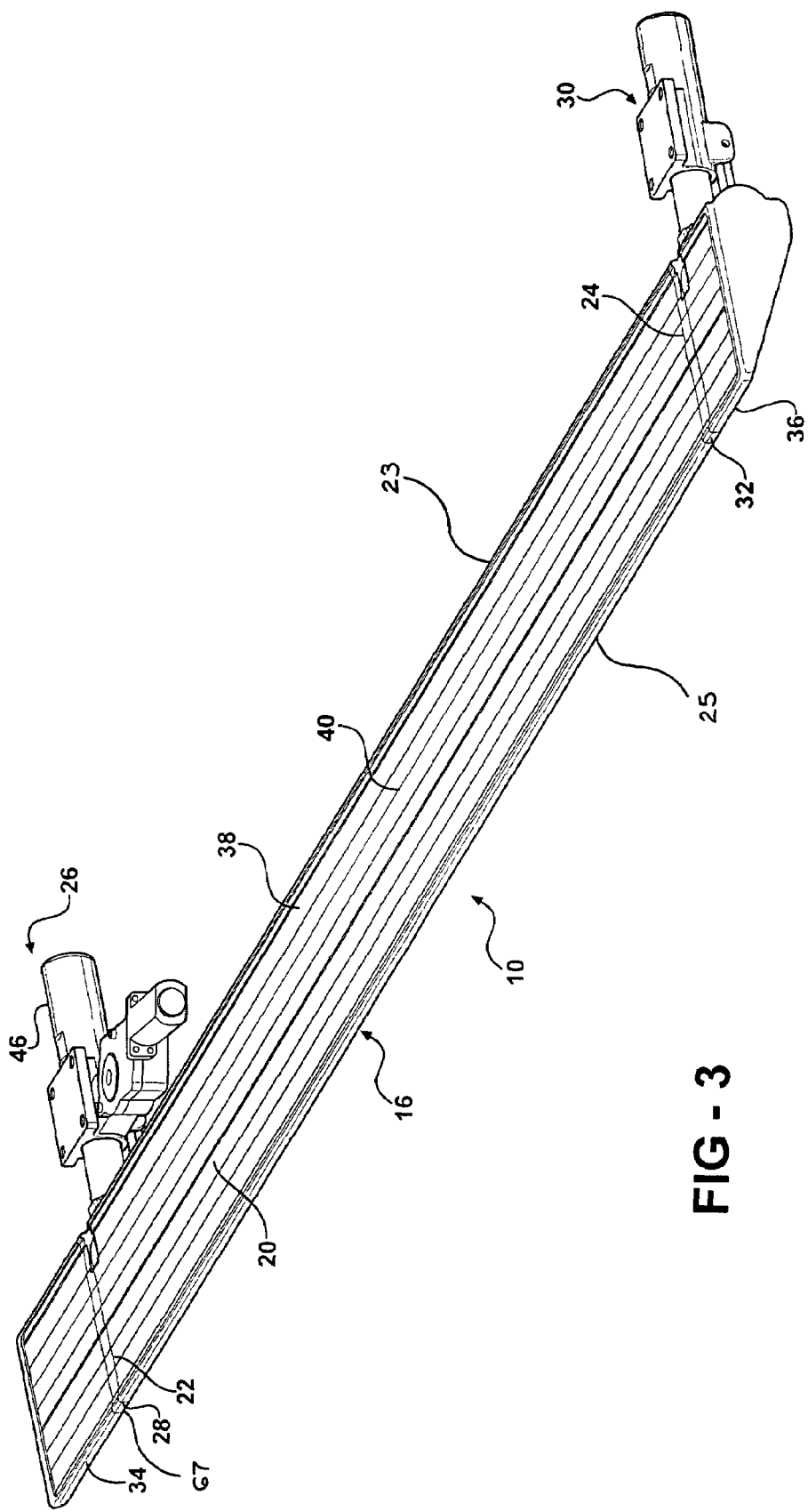
FIG. 3 is a front perspective view of the rocker board assembly including a drive assembly and a slave assembly.

Referring to FIGS. 1 and 2, a rocker board assembly, generally shown at 10, is adapted to be attached along one side 12 of a motor vehicle 14. The rocker board assembly 10 includes an elongated step, generally indicated at 16, movable between a stowed position, shown in FIG. 1, and a deployed position, shown in FIG. 2. The rocker board assembly 10 may be integrated into a rocker panel 18 so that the side 12 of the motor vehicle 14 has a seamless appearance when the step 16 is in the stowed position.

Referring to FIGS. 3 through 6, the step 16 includes a step portion 20 extending longitudinally between opposing ends 22, 24, and laterally between inboard 23 and outboard 25 ends. The rocker board assembly 10 includes a drive assembly, generally shown at 26, having a drive pivot housing 28 coupled to one end 22 of the step portion 20. A slave assembly, generally shown at 30, includes a slave pivot housing 32 coupled to the opposing end 24 of the step portion 20. The spaced apart drive 26 and slave 30 assemblies effect movement of the step 16 between the stowed and deployed positions. The step 16 also includes a first end cap 34 coupled to the drive pivot housing 28, and a second end cap 36 coupled to the slave pivot housing 32.

The step 16 has a top surface 38 with a step tread 40 that provides traction for individuals utilizing the step 16. The step 16 also includes a bottom surface 42, shown in FIG. 5. The bottom surface 42 may have a Class A finish that matches the rocker panel 18 to provide the motor vehicle 14 with a seamless appearance when the step 16 is in the stowed position.

Referring to FIGS. 7 through 10, the drive assembly 26 includes a mounting bracket 44 for attaching the step 16 to the motor vehicle 14. A drive housing 46 is fixedly secured to the mounting bracket 44. The drive housing 46 includes a bore 48 that extends in a cross-car direction. A drive arm 50 is in telescopic engagement with the drive housing 46 for sliding movement in and out of the bore 48 of the drive housing 46. The drive arm 50 includes an outboard distal end 52 that is disposed within the drive pivot housing 28. A drive arm seal 54 is coupled to the drive arm 50 to prevent moisture and the like from entering the bore 48 during the telescopic, sliding movement of the drive arm 50.

An aperture 56 extends through the drive arm 50 proximate the outboard distal end 52 thereof. A drive pivot shaft 58 is received within the aperture 56. A washer 60 is disposed along the drive pivot shaft 58 and abuts the drive arm 50. A retainer 62 is also disposed along the drive pivot shaft 58 adjacent the washer 60. The washer 60 and retainer 62 maintain a tight connection between the drive pivot shaft 58 and the drive arm 50. The drive pivot housing 28 is positioned along the drive pivot shaft 58 for pivotal movement thereabout. The drive pivot housing 28 includes a slot 64 for accommodating the drive arm 50 such that both the drive pivot housing 28 and the drive arm 50 are disposed along the drive pivot shaft 58. A seal 66 is secured to the portion of the drive arm 50 within the slot 64 for sealing out moisture, dirt, and debris. A screw fixedly secures the drive pivot housing 28 between the end 22 of the step portion 20 and the first end cap 34. As a result, pivotal movement of the drive pivot housing 28 about the drive pivot shaft 58 will move the step 16 between the stowed and deployed positions. The drive pivot housing 28 also extends between opposing first 65 and second 67 ends. The first end 65 of the drive pivot housing 28 abuts the inboard end 23 of the step 16 and the second end 67 of the drive pivot housing 28 abuts the outboard end 25 of the step 16.

The drive assembly 26 further includes a drive tilt link 68 extending between an inboard end 70 and an opposing outboard end 72. The inboard end 70 is coupled to the drive housing 46 via a pin 74 that extends through an aperture formed in a tab 76 extending out from the drive housing 46. The outboard end 72 is pivotally coupled to the drive pivot housing 28 about a pin 78. The drive tilt link 68 initiates pivotal movement of the drive pivot housing 28 upon the sliding movement of the drive arm 50 relative to the drive housing 46. Specifically, when the drive arm 50 moves out of the drive housing 46, the drive tilt link 68 urges the drive pivot housing 28 to pivot about the pin 78 to move the step 16 into the deployed position, as shown in phantom line in FIG. 8. And when the drive arm 50 moves into the drive housing 46, the drive tilt link 68 urges the drive pivot housing 28 to pivot about the pin 78 in an opposite direction to move the step 16 into the stowed position, shown in solid line in FIG. 8.

Figure 9:
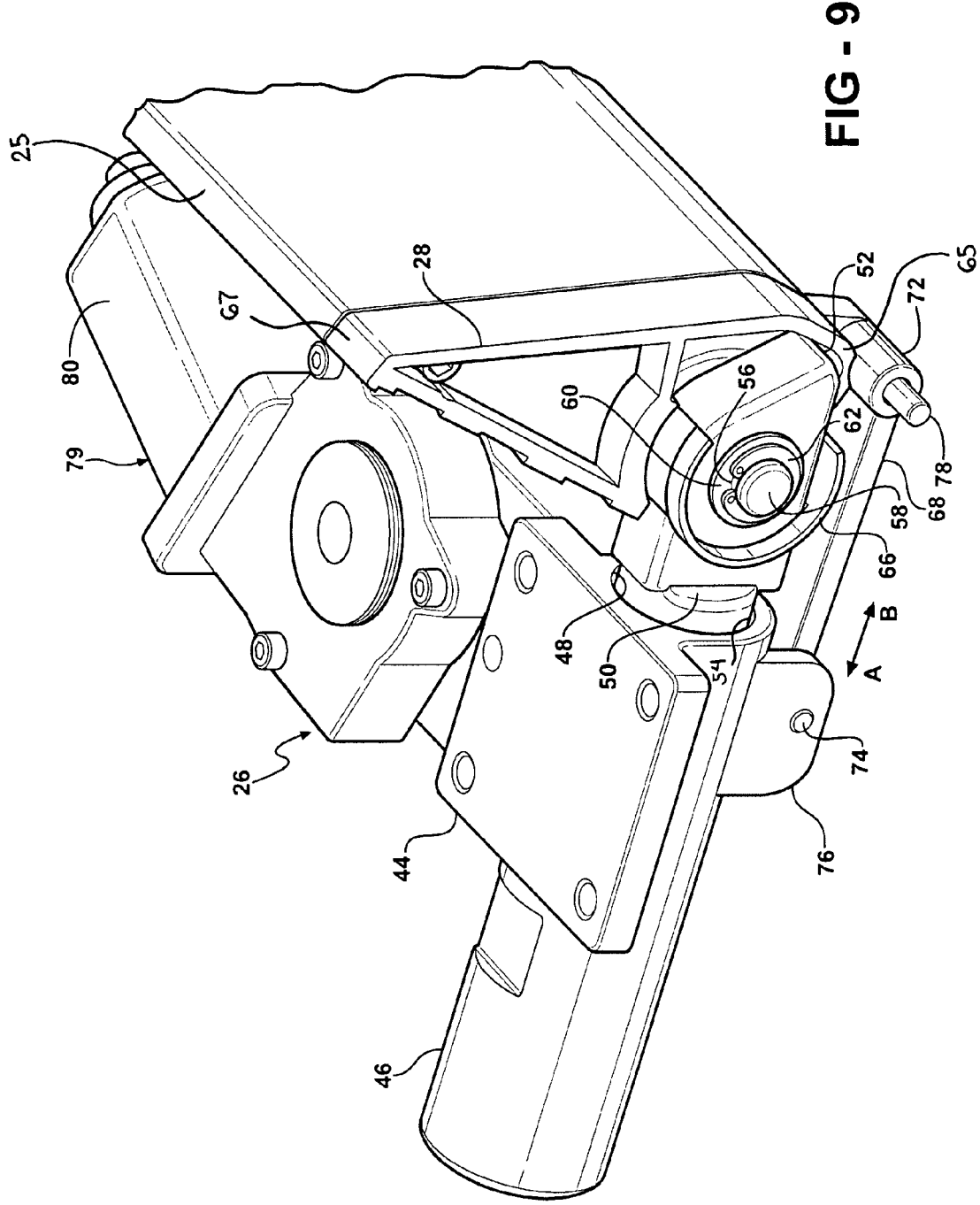
FIG. 9 is a fragmentary perspective view of the rocker board assembly, partially cut away, including a tilt link extending between the drive housing and a drive pivot housing.
Figure 10:
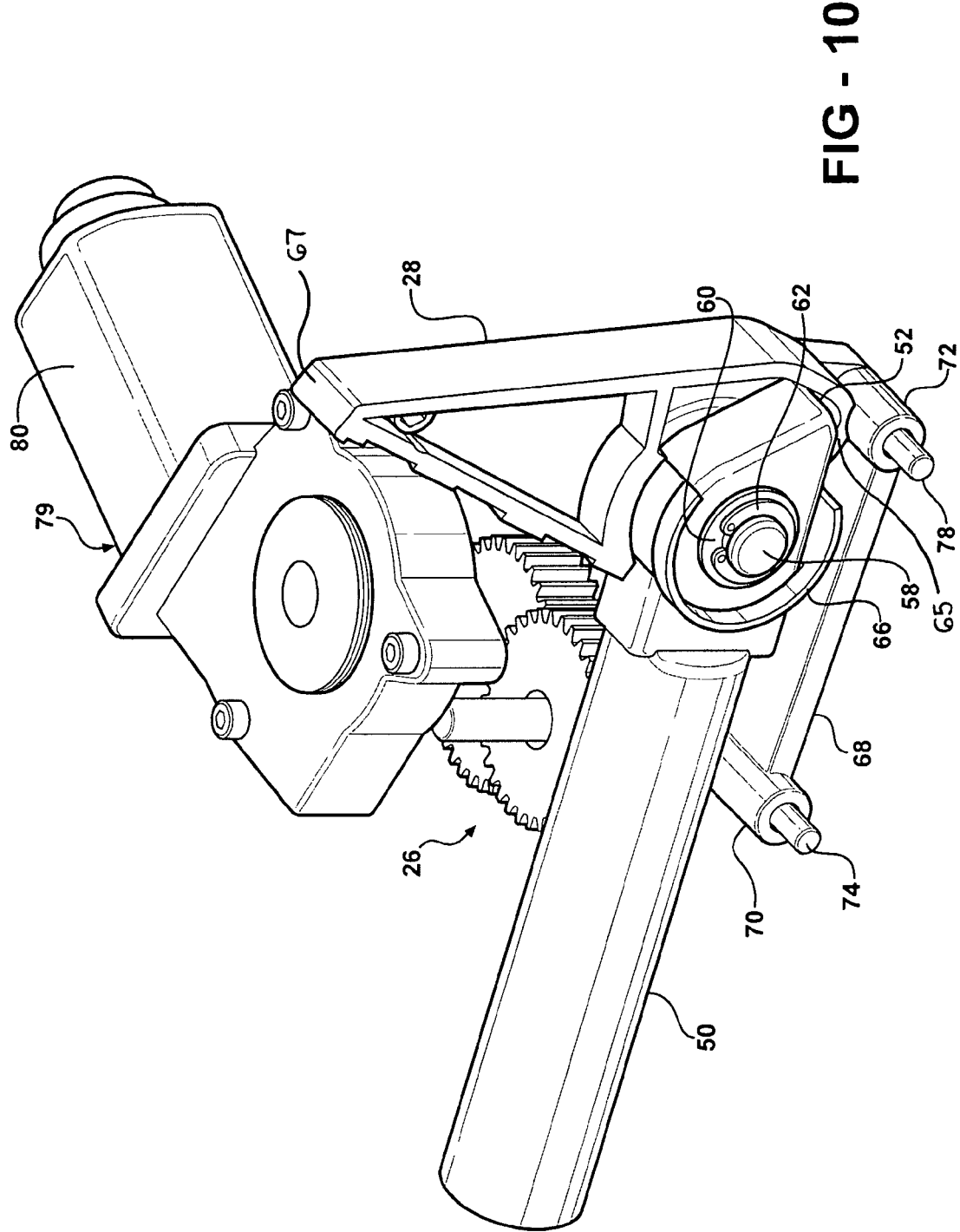
FIG. 10 is a perspective view of the drive assembly and a motor-gear assembly operably coupled thereto.
Figure 11:
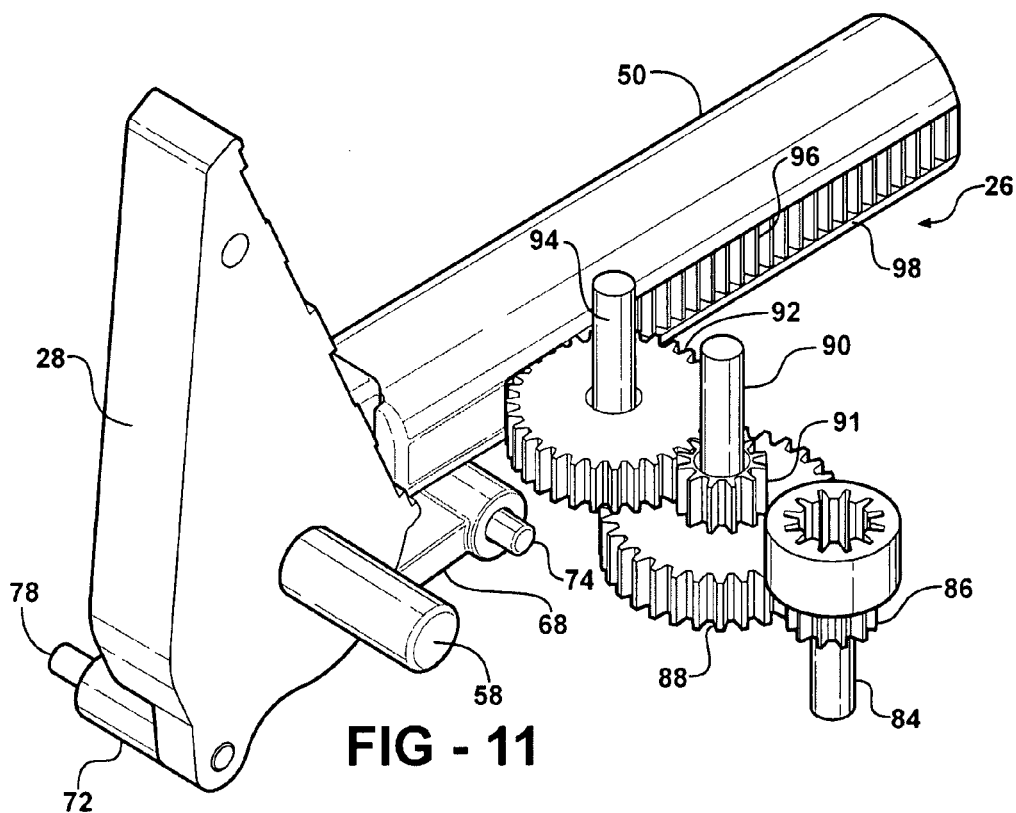
FIG. 11 is a fragmentary perspective view of the drive assembly including a drive arm having a drive rack extending therealong for engagement with the motor-gear assembly.

Referring to FIGS. 9 through 11, the drive assembly 26 also includes a motor-gear assembly, generally shown at 79, including a reversible motor 80 operably connected to the drive arm 50 to effect telescopic, sliding movement of the drive arm 50 in and out of the bore 48 of the drive housing 46. The motor-gear assembly 79 is secured to the drive housing 46 via screws. The motor 80 includes an output shaft operably coupled to a pinion shaft 84. A drive pinion 86 is fixedly secured to the pinion shaft 84. The drive pinion 86 engages a first intermediate gear 88. The first intermediate gear 88 is fixedly mounted about an intermediate gear shaft 90. A second intermediate gear 91 is also fixedly secured about the intermediate gear shaft 90. Therefore, rotational movement of the first intermediate gear 88 results in rotational movement of the second intermediate gear 91. The second intermediate gear 91 in turn is in meshing engagement with a drive gear 92, which is rotatable about a drive gear shaft 94. The drive gear 92 is in engagement with a toothed portion 96 of a linear drive rack 98 formed along the drive arm 50. Upon actuation of the motor 80, the engagement between the drive gear 92 and the toothed portion 96 of the linear drive rack 98 provides for linear movement of the drive arm 50 in a cross-car direction, shown by Arrows A-B, into and out of the bore 48 of the drive housing 46.

Figure 12:
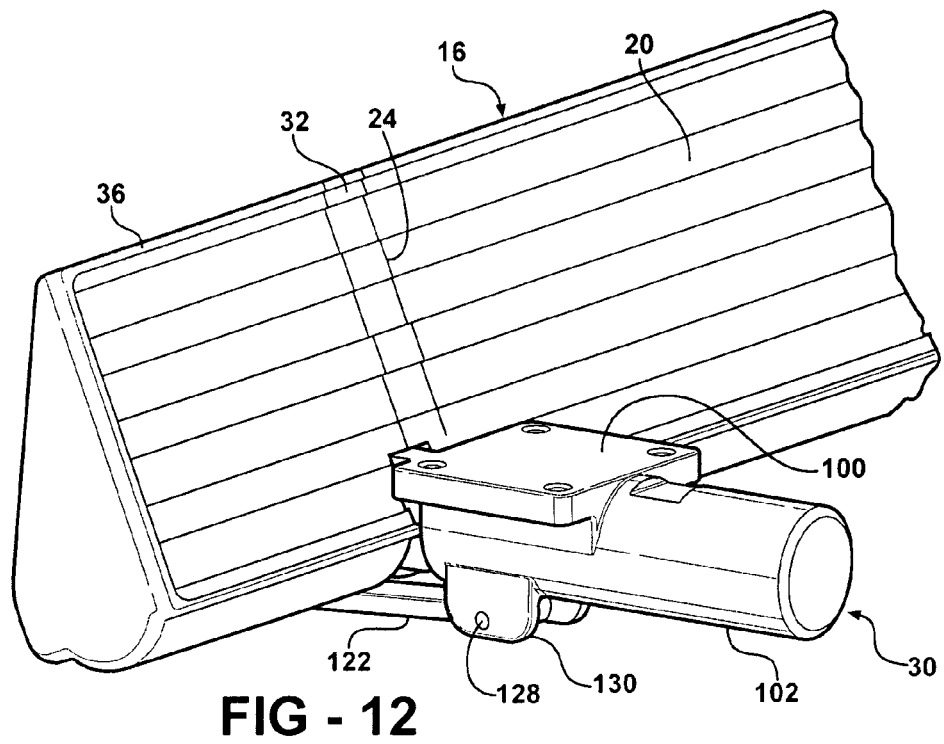
FIG. 12 is a fragmentary perspective view of the rocker board assembly including the slave assembly.
Figure 13:
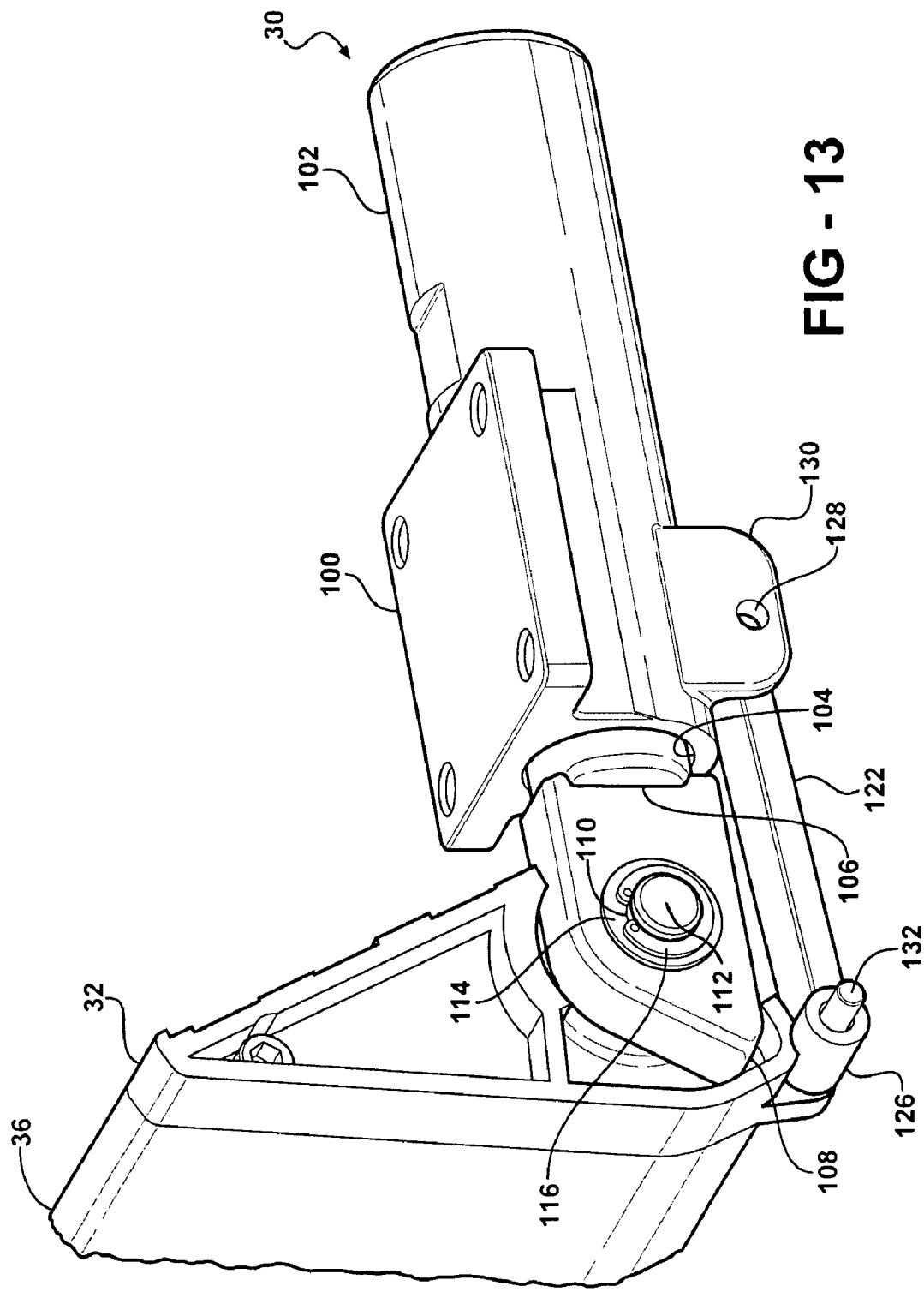
FIG. 13 is a fragmentary perspective view, partially cut away, of the slave assembly including a slave arm in telescopic engagement with a slave housing.
Figure 14:
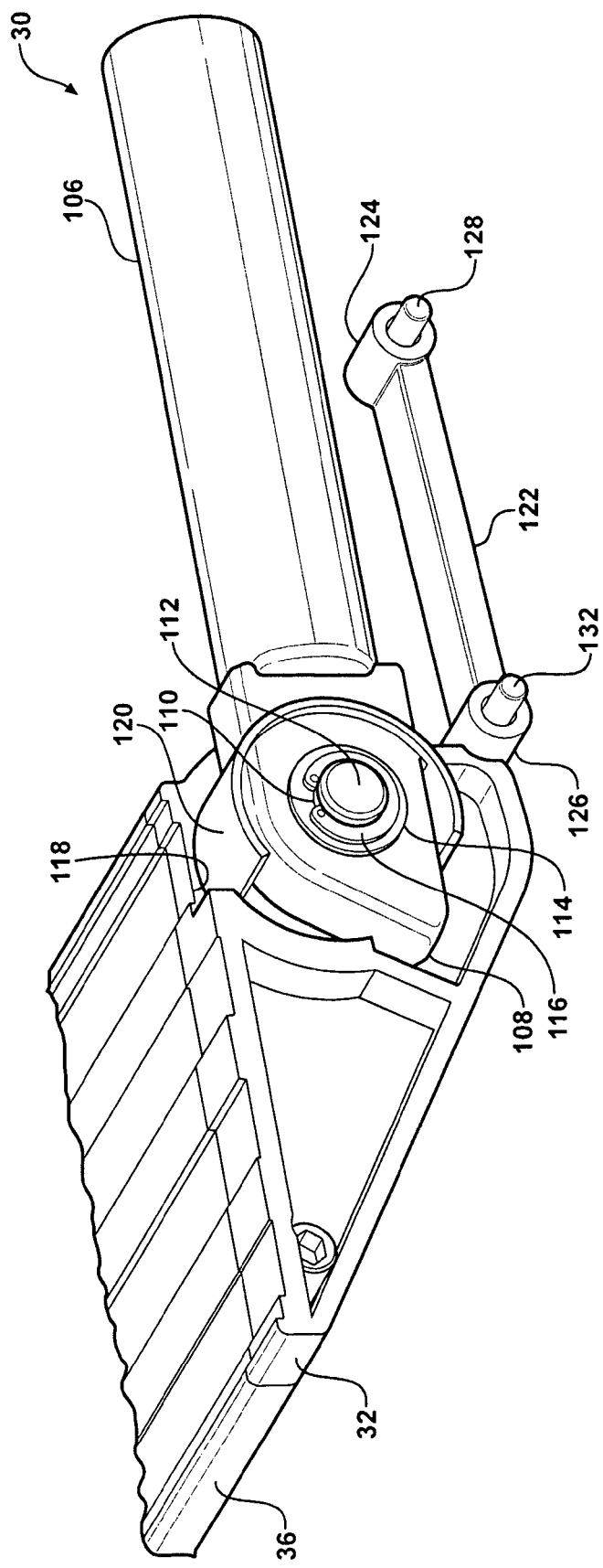
FIG. 14 is a fragmentary perspective view of the rocker board assembly, partially cut away, including the slave assembly having a slave tilt link.
Figure 15:
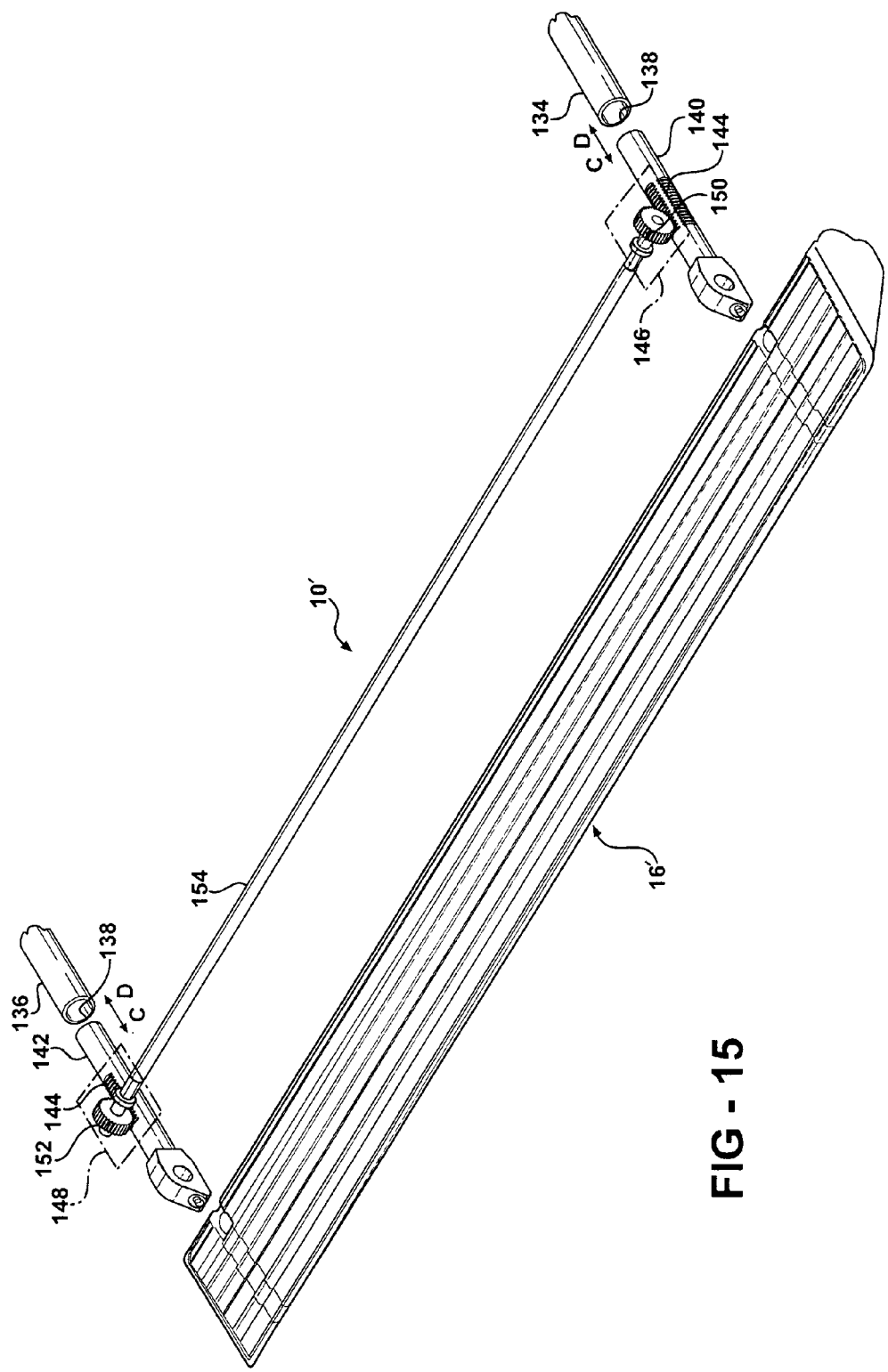
FIG. 15 is an exploded perspective view of a rocker board assembly in another embodiment including an elongated shaft extending between first and second housings.
Figure 16:
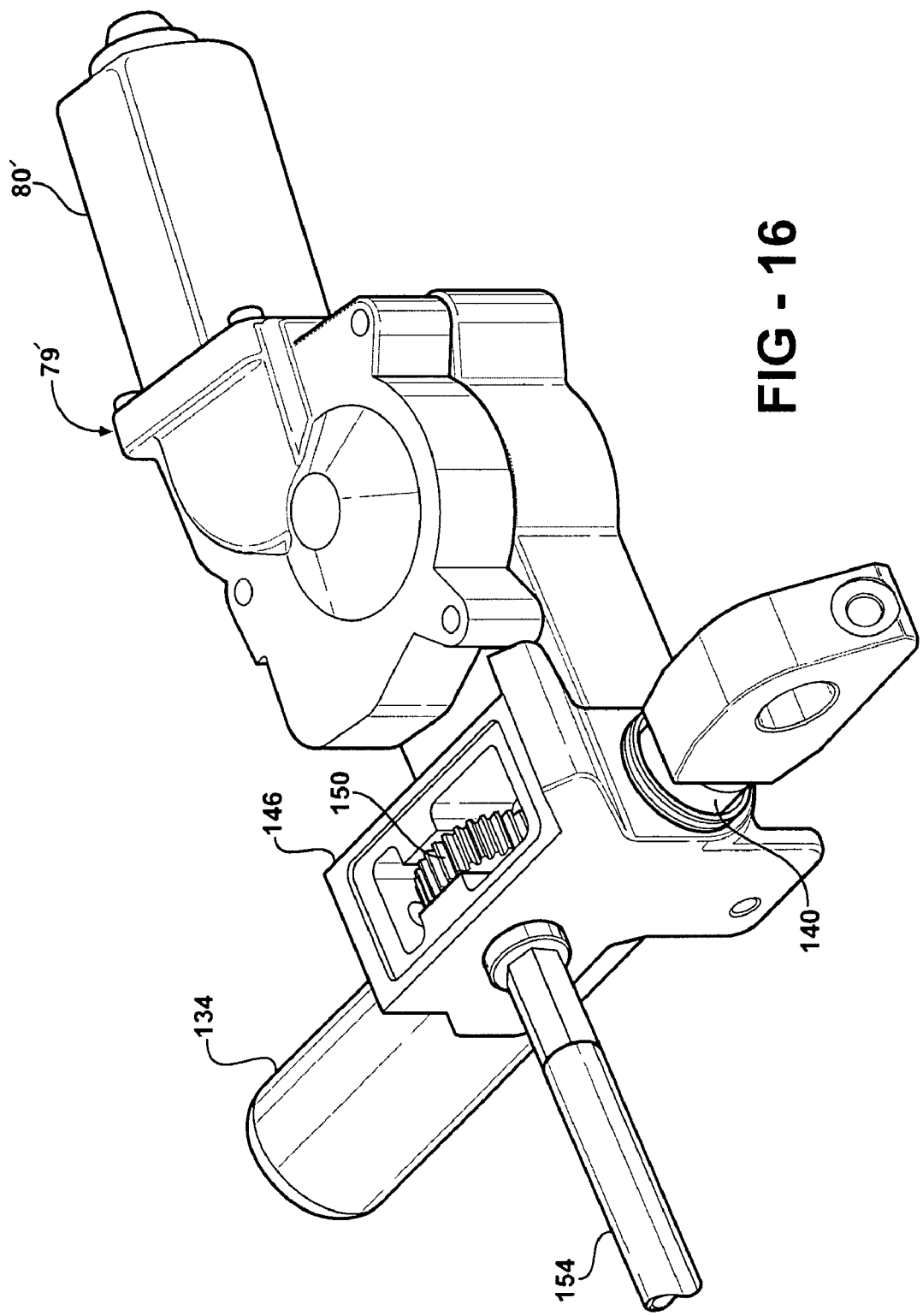
FIG. 16 is a fragmentary perspective view of the first housing, first arm, motor-gear assembly, and gear housing with a pinion.
Figure 17:
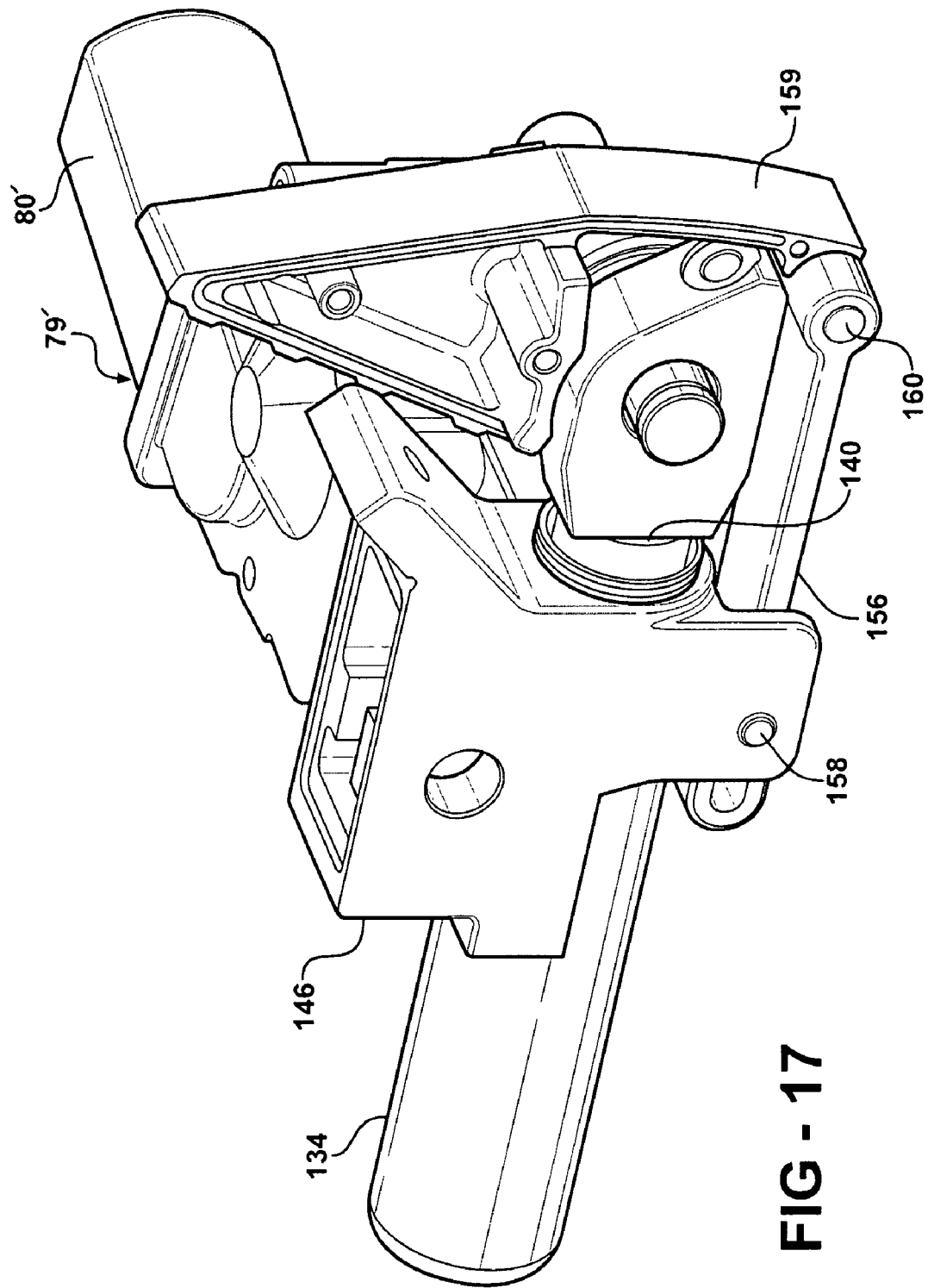
FIG. 17 is a perspective view, partially cut away, including a tilt link extending between the gear housing and a pivot housing.
Figure 18:
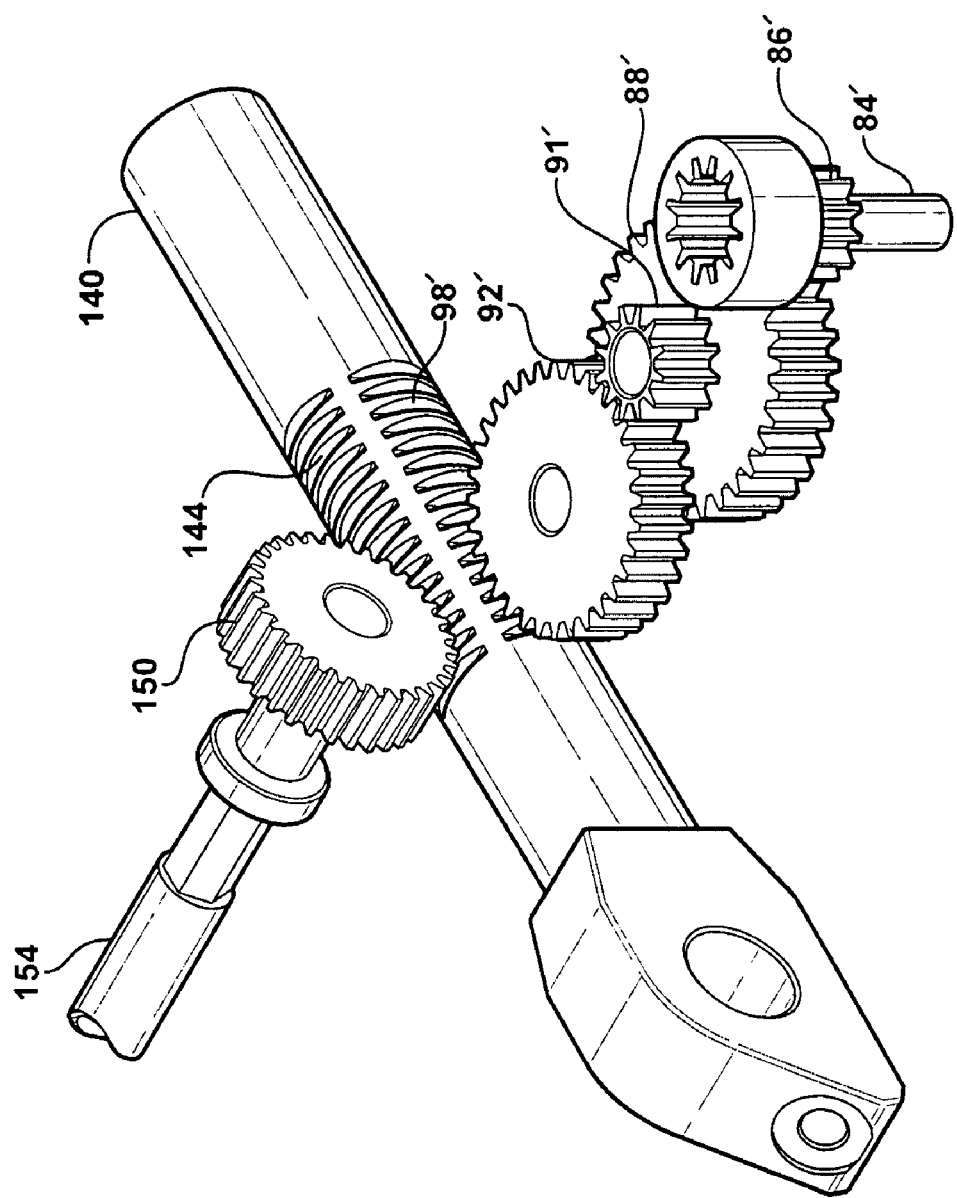
FIG. 18 is a fragmentary perspective view of the pinion engaging an upper rack of the first arm, and a drive gear engaging a linear drive rack of the first arm.

Referring to FIGS. 12 through 14, the slave assembly 30 includes a mounting bracket 100 for attaching the step 16 to the motor vehicle 14. A slave housing 102 is fixedly secured to the mounting bracket 100. The slave housing 102 defines a bore 104 that extends in the cross-car direction. A slave arm 106 is in telescopic engagement with the slave housing 102 for sliding movement in and out of the bore 104 of the slave housing 102. The slave arm 106 includes an outboard distal end 108. An aperture 110 extends through the slave arm 106 at the distal end 108. A slave pivot shaft 112 is received within the aperture 110. A washer 114 is disposed along the slave pivot shaft 112 and abuts the slave arm 106. A retainer 116 is also disposed along the slave pivot shaft 112 adjacent the washer 114. The washer 114 and retainer 116 maintain a tight connection between the slave pivot shaft 112 and the slave arm 106.

The slave pivot housing 32 is also positioned along the slave pivot shaft 112 for pivotal movement thereabout. The slave pivot housing 32 includes a slot 118 for accommodating the slave arm 106 to allow both the slave pivot housing 32 and the slave arm 106 to be disposed along the slave pivot shaft 112. A seal 120 is secured to the portion of the slave arm 106 within the slot 118 for sealing out moisture, dirt, and debris. A screw fixedly secures the slave pivot housing 32 between the end 24 of the step portion 20 and the second end cap 36. As a result, pivotal movement of the slave pivot housing 32 about the slave pivot shaft 112 will allow movement of the step 16 between the stowed and deployed positions.

The slave assembly 30 further includes a slave tilt link 122 extending between an inboard end 124 and an opposing outboard end 126. The inboard end 124 is coupled to the slave housing 102 via a pin 128 that extends through an aperture formed in a tab 130. The outboard end 126 is pivotally coupled to the slave pivot housing 32 about a pin 132. The slave tilt link 122 initiates pivotal movement of the slave pivot housing 32. Specifically, when the slave arm 106 moves out of the slave housing 102, the slave tilt link 122 urges the slave pivot housing 32 to pivot about the slave pivot shaft 112 and move the step 16 from the stowed position, shown in FIGS. 12 and 13, to the deployed position, shown in FIG. 14. And when the slave arm 106 moves into the slave housing 102, the slave tilt link 122 urges the slave pivot housing 32 to pivot about the slave pivot shaft 112 in an opposite direction and move the step 16 from the deployed position to the stowed position.

Figure 4:
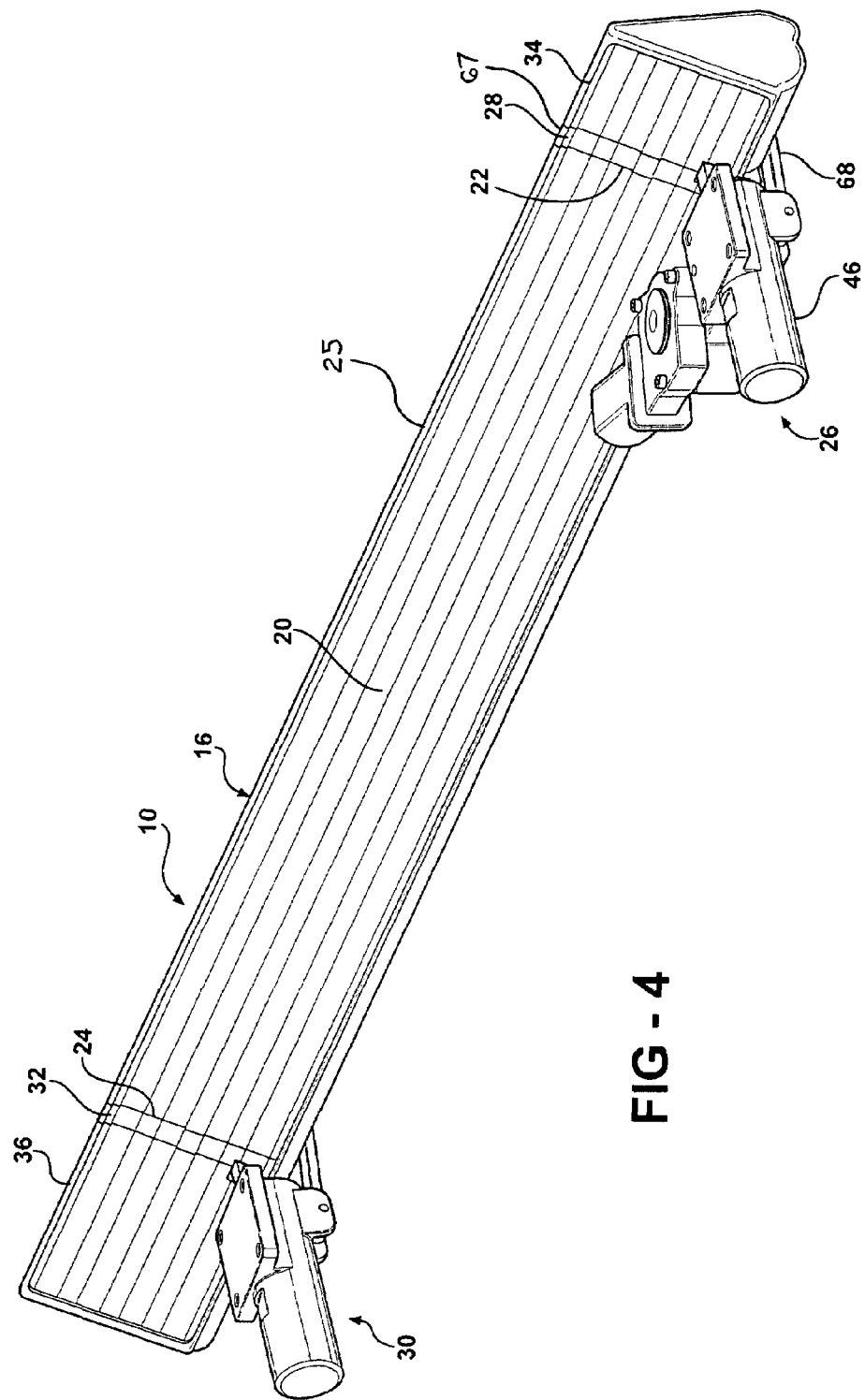
FIG. 4 is a rear perspective view of the rocker board assembly.
Figure 5:
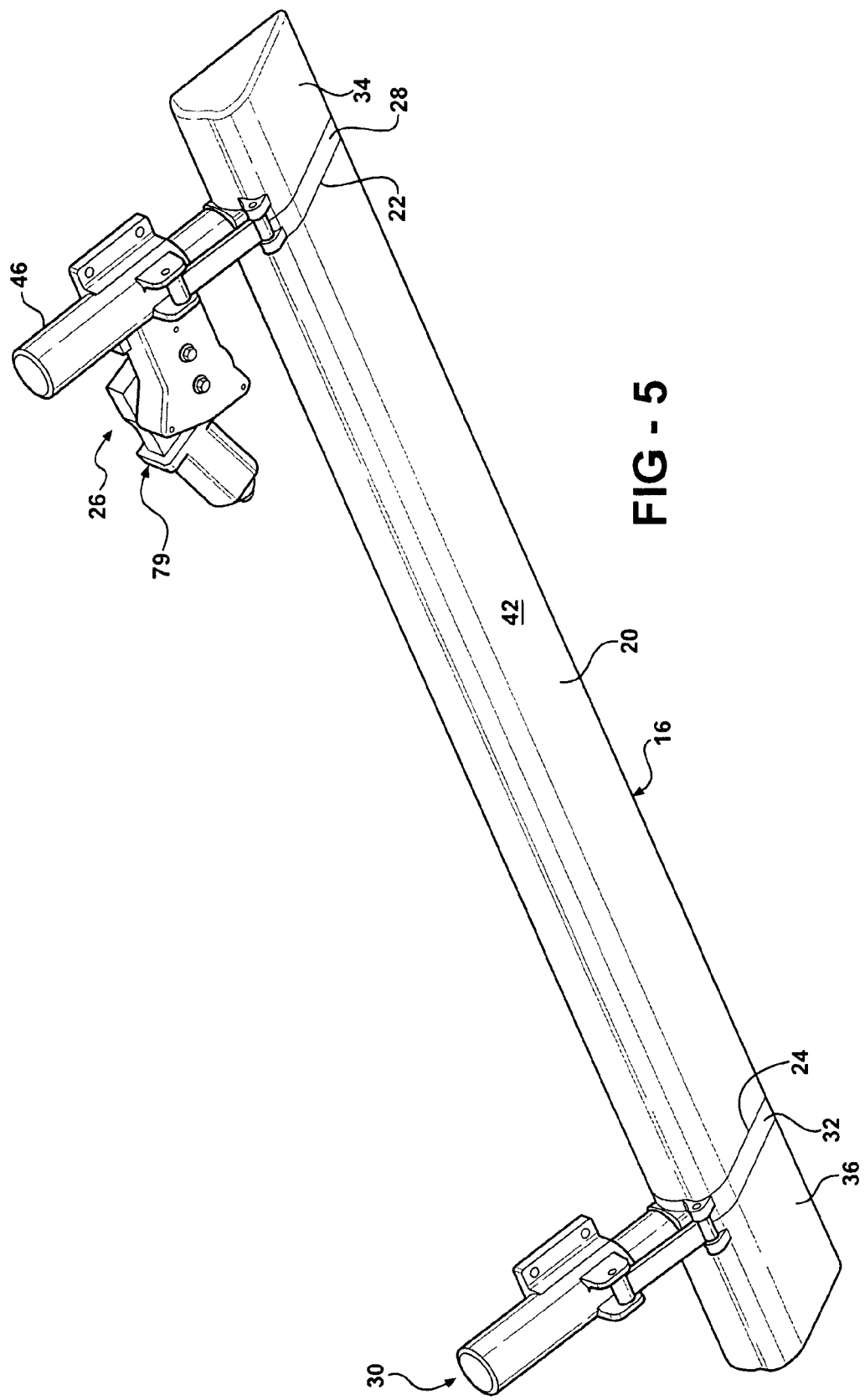
FIG. 5 is a bottom view of the rocker board assembly.
Figure 6:
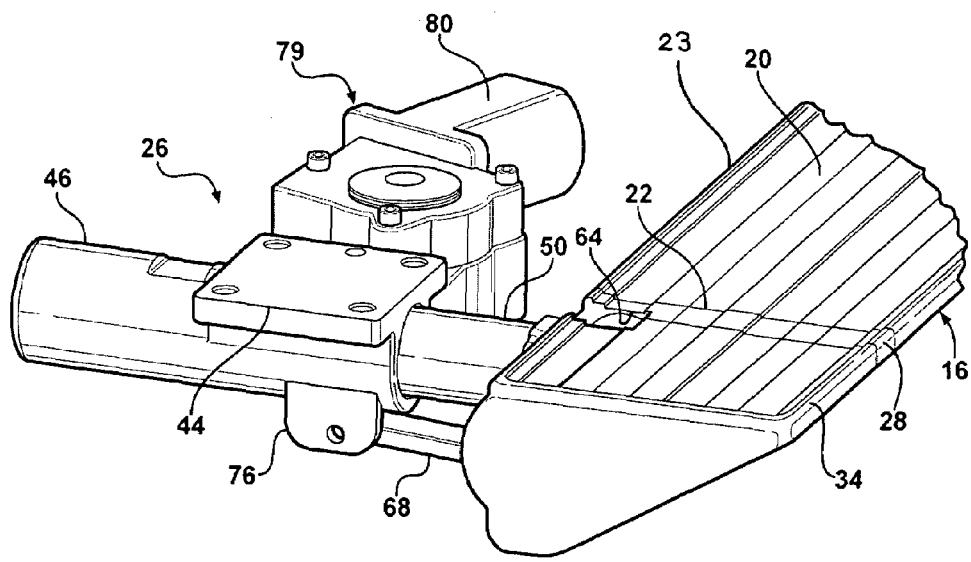
FIG. 6 is a fragmentary perspective view of the rocker board assembly including the drive assembly having a drive arm in telescopic engagement with a drive housing and the step in the deployed position.
Figure 7:
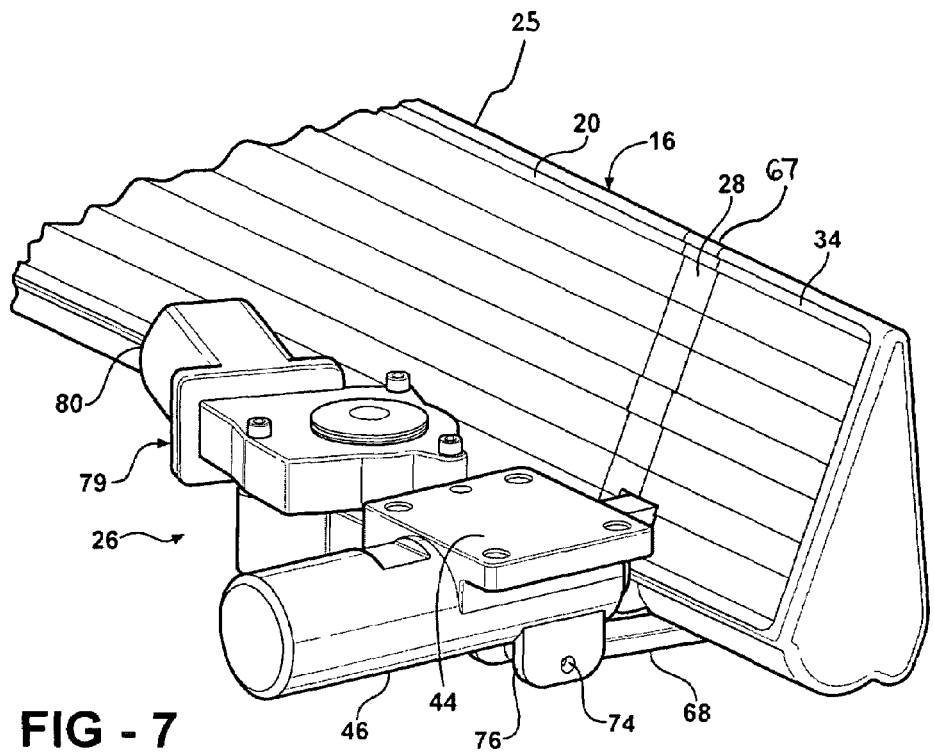
FIG. 7 is a fragmentary perspective view of the rocker board assembly including the drive assembly with the step in the stowed position.
Figure 8:
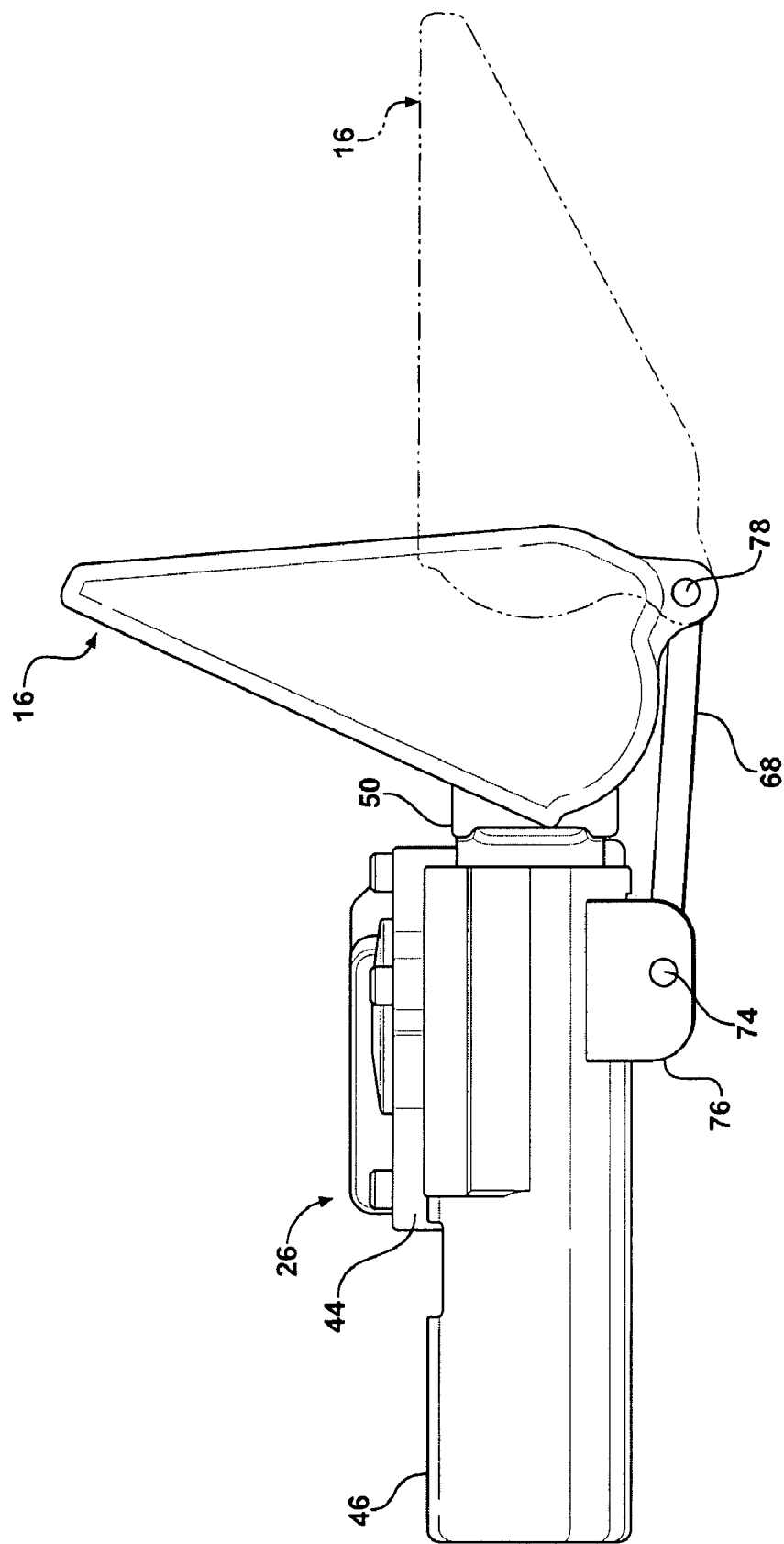
FIG. 8 is an end view of the rocker board assembly including the step in the stowed position.

In operation, starting with the step 16 in the stowed position, as shown in FIGS. 1 and 4, the motor 80 is activated to rotate the drive pinion 86. Since the drive pinion 86 is operably coupled to the drive gear 92 by the intermediates gears 88, 91, the rotation of the drive pinion 86 will rotate the drive gear 92 in a first direction. As a result of the meshing engagement between the drive gear 92 and the linear drive rack 98, the rotation of the drive gear 92 is translated into linear sliding movement of the drive arm 50 out of and away from the bore 48 of the drive housing 46. As the drive arm 50 moves out of the drive housing 46, the drive tilt link 68 urges the drive pivot housing 28 to pivot about the pin 78. The pivotal movement of the drive pivot housing 28 forces the step 20 to pivot about the drive pivot shaft 58. The torsional moment of the step 20 causes the slave arm 106 to slide out of the slave housing 102 at the opposing end of the rocker board assembly 10 until the slave tilt link 122 urges the slave pivot housing 32 to pivot about the pin 132. As a result, the step 20 is moved from the stowed position to the deployed position, shown in FIGS. 2 and 3.

To move the step 20 from the deployed position back to the stowed position, the motor 80 is activated to rotate the drive pinion 86 in an opposite direction. The rotation of the drive pinion 86 will rotate the drive gear 92 in a opposing second direction. As a result of the meshing engagement between the drive gear 92 and the linear drive rack 98, the rotation of the drive gear 92 is translated into linear sliding movement of the drive arm 50 into the drive housing 46. As the drive arm 50 moves into the bore 48 in the drive housing 46, the drive tilt link 68 urges the drive pivot housing 28 to pivot about the pin 78. The pivotal movement of the drive pivot housing 28 forces the step 20 to pivot about the drive pivot shaft 58. This movement of the step 20 causes the slave arm 106 to move into the slave housing 102 at the opposing end of the rocker board assembly 10 until the slave tilt link 122 urges the slave pivot housing 32 to pivot about the pin 132. As a result, the step 20 moves from the deployed position to the stowed position.

The step 20 is stopped in the deployed position upon contacting a mechanical stop between the drive 28 and slave 32 pivot housings and the respective drive 50 and slave 106 arms. At this time, the drive 68 and slave 122 tilt links become tension members limiting the overall travel of the pivot housings 28, 32 and arms 50, 106. The step 16 is controlled in the stowed position by a mechanical contact as the drive 50 and slave 106 arms bottom out in the drive 46 and slave 102 housings. As the drive 50 and slave 106 arms move inward or towards the stowed position, the drive 68 and slave 122 tilt links are in compression and force the step 16 to rotate upwards into the stowed position.

The rocker board assembly 10 packages in a small vertical space and creates both linear motion in a cross-car direction as well rotational movement. The linear motion of the rocker board assembly 10 is tuneable by the radius created by the pivot axis of the pivot shafts 58, 112 and the location of the pivot pins 78, 132 on the respective pivot housings 28, 32.

Referring to FIGS. 15 through 18, wherein primed reference numerals represent similar elements as those set forth above, the rocker board assembly 10' in another embodiment includes spaced apart first 134 and second 136 housings adapted to be fixedly secured to the motor vehicle 14'. Each of the first 134 and second 136 housings includes a bore 138. First 140 and second 142 arms are in telescopic engagement with the respective first 134 and second 136 housings for sliding movement in and out of the bores 138. Each of the first 140 and second 142 arms includes an upper rack 144.

First 146 and second 148 gear housings are fixedly secured to the respective first 134 and second 136 housings. The first gear housing 146 accommodates a first pinion 150 that engages the upper drive rack 144 of the first arm 140. The second gear housing 148 accommodates a second pinion 152 that engages the upper drive rack 144 of the second arm 142. An elongated shaft 154 is fixedly secured between the first 150 and second 152 pinions to operably couple the first arm 140 to the second arm 142.

The movement of the first arm 140 is effected by the motor-gear assembly 79'. Actuation of the motor 80' will cause rotation of the drive gear 92', which by way of meshing engagement with the linear drive rack 98', will urge sliding movement of the first arm 140 in and out of the bore 138 of the first housing 134. As the first arm 140 slides in an out of the bore 138 of the first housing 134, the first pinion 150 engages the upper drive rack 144 for travel therealong. Since the first pinion 150 is coupled to the second pinion 152 by the elongated shaft 154, the movement of the first pinion 150 urges the second pinion 152 into movement along the upper drive rack 144 of the second arm 142. This in turn causes sliding movement of the second arm 142 in the same direction as the first arm 140. Thus, the first 140 and second 142 arms will slide together in the cross-car directions represented by Arrows C-D.

A tilt link 156 is coupled to the first gear housing 146 by an inboard pin 158 and to a pivot shaft 159 by an outboard pin 160. The tilt link 156 will pivot the step 16' about the outboard pin 160 between the stowed and deployed positions as the first arm 140 slides in and out respectively of the first housing 134. Although it is not shown, it is appreciated that another tilt link 156 is coupled between the second gear housing 148 and a pivot shaft to pivot the step 16' as the second arm 142 slides in and out of the second housing 136.

Figure 19:
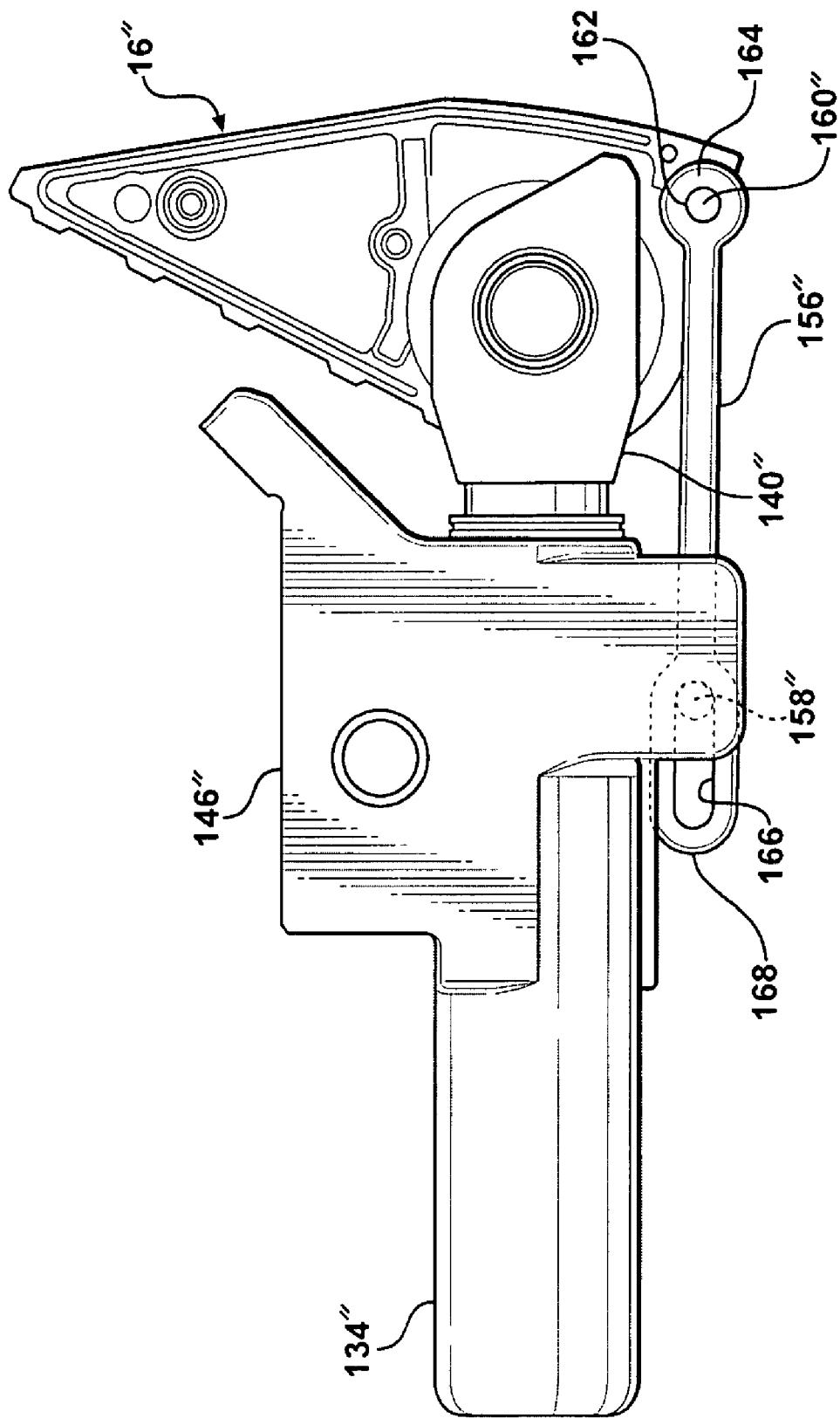
FIG. 19 is an end view, partially cut away, of the rocker board assembly including the tilt link having an elongated slot and a pin at an inboard end thereof with the step in a stowed position.
Figure 20:
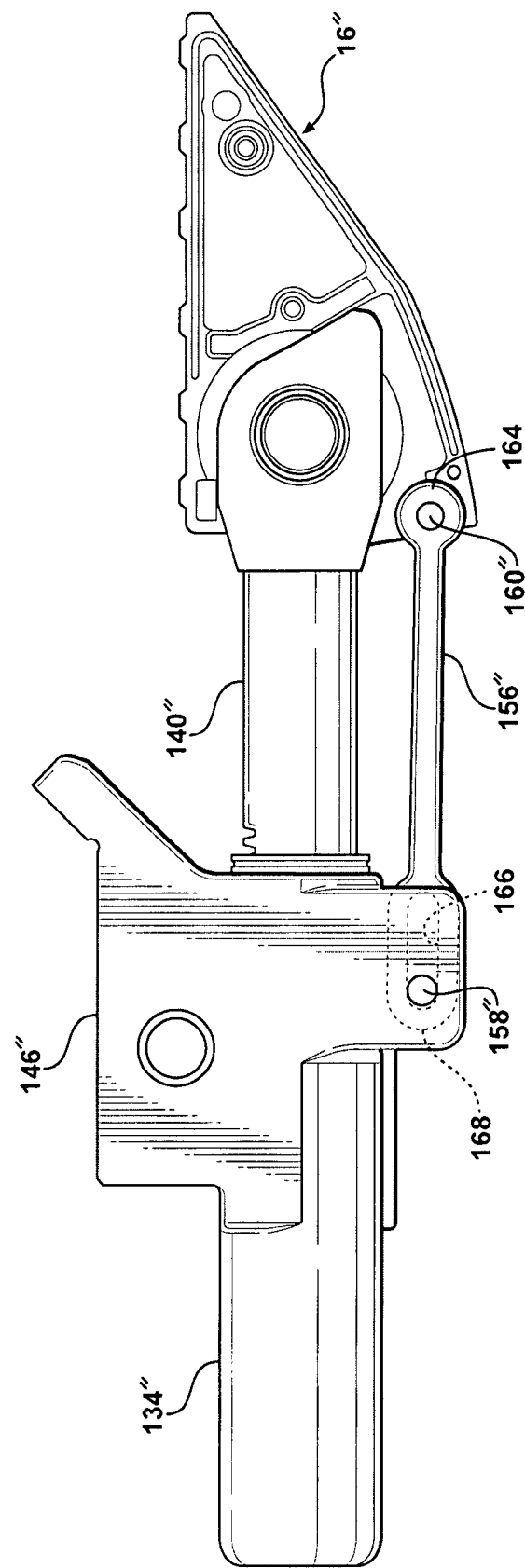
FIG. 20 is an end view, partially cut away, of the rocker board assembly including the pin at an outboard end of the elongated slot of the tilt link with the step in a deployed position.
Figure 21:
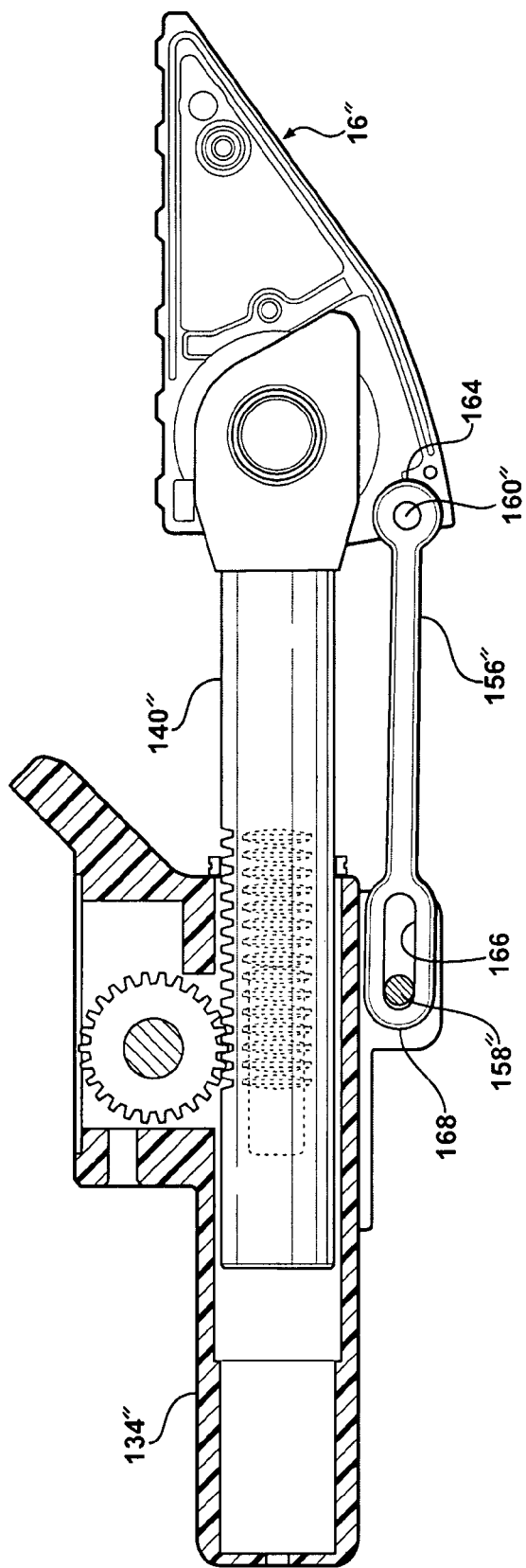
FIG. 21 is an end view similar to FIG. 20 with a gear housing removed.

Referring to FIGS. 19 through 21, wherein double primed reference numerals represent similar elements as those set forth above, the tilt link 156" includes a circular aperture 162 formed at an outboard end 164 for receiving the outboard pin 160" and an elongated slot 166 formed at an inboard end 168 for receiving the inboard pin 158". The elongated slot 166 in the tilt link 156" inboard pin 158" allows the step 16" to pivot about a greater arc than in the previous embodiments to achieve a customized deployed position. The deployed position of the step 16" may be tuned by adjusting the size of the elongated slot 166.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A rocker board assembly for a motor vehicle, said rocker board assembly comprising:
   a housing adapted to be fixedly secured to the motor vehicle;
   an arm slidable relative to said housing;
   a pivot housing pivotal relative to said arm;
   a step fixedly secured to said pivot housing; and
   a tilt link extending between said housing and said pivot housing for urging pivotal movement of said pivot housing as said arm slides relative to said housing to move said step between a stowed position and a deployed position.

2. A rocker board assembly as set forth in claim 1 including a motor-gear assembly operably coupled to said arm to effect sliding movement thereof.

3. A rocker board assembly as set forth in claim 2 wherein said arm includes a linear drive rack formed therealong.

4. A rocker board assembly as set forth in claim 3 wherein said motor-gear assembly includes a drive gear engaging said linear drive rack to provide linear sliding movement of said arm relative to said housing.

5. A rocker board assembly as set forth in claim 4 wherein said housing includes a bore formed therewithin for receiving said arm.

6. A rocker board assembly as set forth in claim 1 including an inboard pin coupling said tilt link to said housing.

7. A rocker board assembly as set forth in claim 6 wherein said tilt link includes an elongated slot at one end receiving said inboard pin to adjust an outboard location of said step in said deployed position.

8. A rocker board assembly as set forth in claim 1 including a gear housing coupled to said housing.

9. A rocker board assembly as set forth in claim 8 including an inboard pin coupling said tilt link to said gear housing.

10. A rocker board assembly as set forth in claim 9 wherein said tilt link includes an elongated slot at one end receiving said inboard pin to adjust an outboard location of the step in said deployed position.

11. A rocker board assembly for a motor vehicle, said rocker board assembly comprising:
 a drive housing adapted to be fixedly secured to the motor vehicle;
 a drive arm telescopically engaging said drive housing for sliding movement in and out of said drive housing;
 a drive pivot housing pivotally secured to said drive arm;
 a step fixedly secured to said drive pivot housing; and
 a tilt link extending between said drive housing and said drive pivot housing for urging pivotal movement of said drive pivot housing as said drive arm slides in and out of said drive housing to move said step between a stowed position and a deployed position.

12. A rocker board assembly as set forth in claim 11 including a slave pivot housing fixedly secured to said step at a location spaced apart from said drive pivot housing.

13. A rocker board assembly as set forth in claim 12 including a slave housing adapted to be fixedly secured to the motor vehicle.

14. A rocker board assembly as set forth in claim 13 including a slave arm in telescopic engagement with said slave housing for sliding movement of said slave arm in and out of said slave housing.

15. A rocker board assembly as set forth in claim 14 wherein said slave pivot housing is pivotally coupled to said slave arm.

16. A rocker board assembly as set forth in claim 15 including a slave tilt link having one end coupled to said slave housing and an opposing end coupled to said slave pivot housing for urging pivotal movement of said step in response to pivotal movement of said pivot drive housing.

17. A rocker board assembly for a motor vehicle, said rocker board assembly comprising:
 a first housing adapted to be fixedly secured to the motor vehicle;
 a first arm slidingly engaging said first housing;
 a second housing adapted to be fixedly secured to the motor vehicle, said second housing spaced apart from said first housing;
 a second arm slidingly engaging said second housing;
 a step pivotally coupled to said first and second arms; and
 a tilt link having one end coupled to said first housing and an opposing end operably coupled to said step to pivot said step between a stowed position and a deployed position upon sliding movement of said arms towards and away from said first and second housings.

18. A rocker board assembly as set forth in claim 17 wherein said first arm includes an upper rack extending therealong.

19. A rocker board assembly as set forth in claim 18 including a drive pinion engaging said upper rack.

20. A rocker board assembly as set forth in claim 19 including a motor operably coupled to said first arm for effecting sliding movement of said first arm relative to said first housing.

21. A rocker board assembly as set forth in claim 20 wherein said second arm includes an upper rack extending therealong.

22. A rocker board assembly as set forth in claim 21 including a drive pinion engaging said upper rack of said second arm.

23. A rocker board assembly as set forth in claim 22 including an elongated shaft fixedly secured between said drive pinion along said first arm and said drive pinion along said second arm to couple movement of said second arm to movement of said first arm.

24. A rocker board assembly as set forth in claim 17 including an elongated shaft extending between said first and second arms to couple movement of said second arm to movement of said first arm.

25. A rocker board assembly as set forth in claim 24 including an inboard pin coupling said tilt link to each said first and second housings.

26. A rocker board assembly as set forth in claim 25 wherein said tilt link includes an elongated slot at one end receiving said inboard pin to adjust an outboard location of said step in said deployed position.

27. A rocker board assembly for a motor vehicle, said rocker board assembly comprising:
 a housing adapted to be fixedly secured to the motor vehicle;
 an arm slidingly engaging said housing;
 a pivot housing pivotally secured to said arm, said pivot housing including a first end and an opposing second end; and
 a step fixedly secured to said pivot housing for movement between a stowed position and a deployed position, said step having an inboard end and an outboard end;
 said first end of said pivot housing abutting said inboard end of said step and said second end of said pivot housing abutting said outboard end of said step.

* * * * *